United States Patent [19]

Campbell

[11] Patent Number: 4,477,529

[45] Date of Patent: Oct. 16, 1984

[54] PHOTOCURABLE POLYFUNCTIONAL ACRYLIC COATING AND DECORATIVE ARTICLES COATED THEREWITH

[75] Inventor: Richard W. Campbell, Evansville, Ind.

[73] Assignee: General Electric Company, Pittsfield, Mass.

[21] Appl. No.: 566,626

[22] Filed: Dec. 29, 1983

[51] Int. Cl.$^3$ .............................................. B05D 3/06
[52] U.S. Cl. ............................. 428/412; 204/159.15; 204/159.23; 427/54.1
[58] Field of Search ............... 427/54.1; 428/409, 412; 204/159.15, 159.23

[56] References Cited

U.S. PATENT DOCUMENTS 3,629,165 12/1971 Hoddstock ........................ 521/112
4,198,465 4/1980 Moore et al. ..................... 428/409
4,287,227 9/1981 Kamada et al. .................. 428/412

Primary Examiner—John H. Newsome
Attorney, Agent, or Firm—John W. Harbour; Edward K. Welch, II; William F. Mufatti

[57] ABSTRACT

A plastic article having adhered thereto a translucent and decorative UV cured coating on the surface thereof which coating is wrinkled in a macroscopically irregular but microscopically regular manner and comprised of the photoreaction products of (i) certain polyfunctional acrylate monomers (ii) certain polysiloxane-polyether block copolymer surfactants and (iii) azobisisobutyronitrile.

22 Claims, No Drawings

PHOTOCURABLE POLYFUNCTIONAL ACRYLIC COATING AND DECORATIVE ARTICLES COATED THEREWITH

This invention relates to polycarbonate articles or other polymeric articles coated with a photocured coating comprised of the photoreaction products of certain polyfunctional acrylate ester monomers or mixtures thereof, certain polysiloxane-polyether block copolymers or mixtures thereof, and azobisisobutyronitrile; to methods of producing such articles; and to the coatings used thereon.

More particularly, this invention relates to polycarbonate or other polymeric substrates having a photocured coating thereon which coating is translucent with a decorative frost-like appearance, is durably and tenaciously adhered to the surface of the polycarbonate or plastic substrate, and is compatible with the polycarbonate or plastic substrate; i.e., does not adversely affect the substrate by stress cracking and crazing it, by causing crack propagation into the substrate as a result of brittleness of the coating itself, and/or by adversely affecting the properties of the substrate generally such as, for example, impact resistance, elongation, and tensile strength.

BACKGROUND OF THE INVENTION

Polycarbonates are commercially important materials possessing excellent physical and chemical properties which are useful in a wide range of applications from non-opaque impact resistant sheets to shaped articles. The usefulness of the polycarbonates has been even further broadened in recent years, first by the development of a general application lamination and plastics coating technology and subsequently by the development of a lamination and plastics coating technology specific to the polycarbonates. The processes of these technologies attempt to combine the desirable properties of a polycarbonate with the properties of a laminate or plastics coating to produce a superior plastic article.

Many of the prior art lamination and plastics coating techniques have been directed towards improving the scratch- and mar- resistance of polycarbonate and other polymeric substrates, while preserving outdoor weathering characteristics and optical clarity. However, coatings may have application directed towards the improvement of a wide range of substrate characteristics, for example, solvent resistance or decorative appearance.

The acrylics, especially the polyfunctional acrylics, have been successfully used for some time in the plastics coating industry as a coating material for a wide range of substrates. Generally, the primary purpose of the acrylic coatings has been to improve weathering characteristics, scratch- and mar- resistance, and resistance to solvent attack, while preserving the non-opacity of the article.

U.S. Pat. No. 3,968,305 describes a synthetic shaped article having a mar-resistant polymer surface layer, with such a polymer surface layer consisting essentially of, in polymerized form, (a) 20 to 100 weight percent of a compound having a total of at least three acryloxy and/or methacryloxy groups linked with a straight chain aliphatic hydrocarbon residue having not more than 20 carbon atoms and, (b) 0 to 80 weight percent of at least one copolymerizable mono- or diethylenically unsaturated compound. This non-opaque surface layer is applied primarily to enhance scratch- and mar-resistance. It suffers from the fact that it generally has poor durability of adhesion after prolonged exposure to weathering.

U.S. Pat. No. 3,968,309 describes a molded article of plastic having on its surface a cured film of a coating material having a thickness of about 1 to about 50 microns comprising at least 30% by weight of at least one polyfunctional compound selected from the group consisting of polymethacryloxy or polyacryloxy compounds having a molecular weight of 250 to 800 and containing at least three functional groups in the molecule, and optionally, 0.01 to 5% by weight of a fluorine-containing surfactant and 0.01 to 5% by weight of a carbonyl photosensitizer. The surface characteristics which this coating material imparts to the article, are high surface hardness and minimized optical distortion.

Certain acrylic coatings have been found to be especially useful when applied to polycarbonate substrates. U.S. Pat. No. 4,198,465 describes a polycarbonate article having on its surface a UV cured coating comprised of the photoreaction products of (i) at least one polyfunctional acrylate monomer having from 2 to 4 functional groups attached to an aliphatic hydrocarbon residue containing 1–20 carbon atoms and optionally having ether linkages and/or substituted hydroxl groups; (ii) a photoinitiator; and (iii) resorcinol monobenzoate. The application of such a polyfunctional acrylic coating increases the scratch- and mar-resistance of the polycarbonate article without an increase in optical distortion.

It has now been found that a coating composition containing certain specific polyfunctional acrylic monomers in combination with certain polysiloxane-polyether block copolymers and azobisisobutyronitrile provides an excellent decorative plastic and durable UV curable coating for polycarbonate and other substrates. This decorative and durable coating is translucent, having a surface texture exhibiting a pattern of very regularly spaced parallel ridges which surface feels slippery to the touch.

The present invention provides certain polyfunctional acrylate ester monomer based UV-curable coatings for polycarbonates and other plastic substrates, a method for application of such coatings, and a resultant coated plastic article. These coatings adhere tenaciously and durably; are especially compatible with polycarbonate; are mar-, abrasion- and solvent-resistant; are not deleteriously affected by exposure to weathering; and provide a decorative, translucent appearance to a plastic article.

DESCRIPTION OF THE INVENTION

In accordance with the present invention, there is provided a non-opaque, more specifically, a translucent polycarbonate or other polymeric article having deposited on the surface thereof an adherent, mar-, abrasion-, and chemical solvent-resistant, non-opaque, decorative coating, said decorative coating containing the photoreaction products of at least one UV curable polyfunctional acrylate monomer, certain polysiloxane-polyether block copolymer surfactants, and azobisisobutyronitrile.

The polyfunctional acrylate ester monomers of the present invention are represented by the general formula:

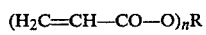  (1)

wherein n is an integer from 2 to 8, preferably from 2 to 6, and more preferably from 2 to 4; and R is selected from n valent hydrocarbon residue, n valent substituted hydrocarbon residue, n valent hydrocarbon residue containing at least one ether linkage, and n valent substituted hydrocarbon residue containing at least one ether linkage.

Preferred n valent hydrocarbon residues are the n valent aliphatic, preferably saturated aliphatic, hydrocarbon residues containing from 1 to about 20 carbon atoms and the n valent aromatic hydrocarbon residues containing from 6 to about 10 carbon atoms.

Preferred n valent hydrocarbon residues containing at least one ether linkage are the n valent aliphatic hydrocarbon residues, preferably saturated aliphatic hydrocarbon residues, containing from 1 to about 5 ether linkages and from 2 to about 20 carbon atoms.

Preferred n valent substituted hydrocarbon residues are the n valent aliphatic hydrocarbon residues, preferably the saturated aliphatic hydrocarbon residues, containing from 1 to about 20 carbon atoms and the n valent aromatic hydrocarbon residues containing from 6 to 10 carbon atoms, which may contain substituent groups such as; the halogens, for example, fluorine, chlorine, bromine and iodine; hydroxyl; —COOH; and —COO-$R^{IV}$ groups, wherein $R^{IV}$ represents alkyl groups containing from 1 to about 6 carbon atoms.

Preferred n valent substituted hydrocarbon residues containing at least one ether linkage are the n valent aliphatic hydrocarbon residues, preferably saturated aliphatic hydrocarbon residues, containing from 2 to about 20 carbon atoms and from 1 to about 5 ether linkages, which contain substituent groups such as; halogen, hydroxyl, —COOH, and —COO$R^{IV}$ groups wherein $R^{IV}$ is as defined above.

It is to be understood that where substituent groups are present, they should be such that they do not unduly hinder or interfere with the photocure of the polyfunctional acrylic monomers.

The more preferred polyfunctional acrylic monomers are those represented by formula 1 wherein R is an n valent saturated aliphatic hydrocarbon residue containing from 1 to about 20 carbon atoms, a hydroxyl substituted n valent saturated aliphatic hydrocarbon residue containing from 1 to about 20 carbon atoms, an n valent saturated aliphatic hydrocarbon residue containing from 2 to about 20 carbon atoms and from 1 to about 5 ether linkages, and a hydroxyl substituted n valent saturated aliphatic hydrocarbon residue containing from 2 to about 20 carbon atoms and from 1 to 5 ether linkages.

The most preferred polyfunctional acrylate ester monomers are those wherein R in formula 1 is an n valent saturated aliphatic hydrocarbon, ether, or polyether radical. The monomers wherein R is an n valent saturated aliphatic hydrocarbon radical are particularly suitable.

The difunctional acrylic monomers, or diacrylates, are represented by formula 1 wherein n is 2; the trifunctional acrylate monomers, or triacrylates, are represented by formula 1 wherein n is 3; and the tetra-functional acrylic monomers, or tetraacrylates, are represented by formula 1 wherein n is 4.

Illustrative of suitable polyfunctional acrylate ester monomers of formula 1 are those listed below.

These polyacrylate esters and their production are well known to those skilled in the art. One method of producing the di-, tri-, and tetra-acrylate esters involves reacting acrylic acid with a di-, tri-, or tetra-hydroxyl compound to produce the diester, triester or tetraester. Thus, for example, acrylic acid can be reacted with ethylene glycol to produce ethylene glycol diacrylate.

Although the coating compositions may contain one or more of said polyfunctional acrylate monomers, preferred coating compositions contain a mixture of two polyfunctional monomers, preferably a diacrylate and a triacrylate. When the preferred coating composition contains a mixture of diacrylate and triacrylate monomers, it is preferred that the ratio, by weight, of the diacrylate to the triacrylate be from about 30/70 to about 70/30. Exemplary mixtures of diacrylates and triacrylates include mixtures of hexanediol diacrylate with pentaerythritol triacrylate, hexanediol diacrylate with trimethylolpropane triacrylate, diethyleneglycol diacrylate with pentaerythritol triacrylate, and diethyleneglycol diacrylate with trimethylolpropane triacrylate.

Though not essential to the invention, the coating composition generally contains from about 92% to about 99.7% by weight of the polyfunctional acrylate monomers or mixture of acrylate monomers. Similarly, the UV curable coating composition contains substantially the same amount by weight of the photoreaction products of the polyfunctional acrylate monomers. Naturally, the fixed percentages given above may be reduced by the incorporation of various optional constituents disclosed below.

The polysiloxane-polyether block copolymer surfactants of the present invention are particularly characterized by the fact that they contain no silicon-oxygen-carbon linkages. The preferred polysiloxane-polyether block copolymer surfactants are represented by the general formula:

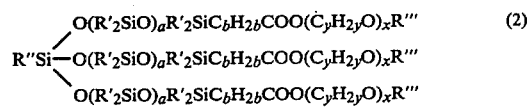

$$R''Si \begin{cases} O(R'_2SiO)_aR'_2SiC_bH_{2b}COO(C_yH_{2y}O)_xR''' \\ O(R'_2SiO)_aR'_2SiC_bH_{2b}COO(C_yH_{2y}O)_xR''' \\ O(R'_2SiO)_aR'_2SiC_bH_{2b}COO(C_yH_{2y}O)_xR''' \end{cases} \quad (2)$$

wherein R' and R'' are monovalent hydrocarbon radicals; R''' is a lower alkyl radical; a has a value of at least 2, for example, from about 2 to 40 or more; b has a value of from 2 or 3; y has a value of from 2 to 4, inclusive; and x has a value of at least 5, for example, from 5 to 100 or more.

Among the radicals represented by R' and R'' in Formula 2 can be mentioned, for example, alkyl radicals, for example, methyl, ethyl, propyl, butyl, octyl, and the like; cycloaliphatic radicals, for example, cyclohexyl, cycloheptyl, and the like; aryl radicals, for example, phenyl, tolyl, naphthyl, xylyl, and the like; aralkyl radicals, for example, benzyl, phenylethyl, and the like; alkenyl and cycloalkenyl radicals, for example, vinyl, allyl, cyclohexenyl, and the like; and halogenated radicals of the aforementioned type, for example, chloromethyl, chlorophenyl, dibromophenyl, and the like. As previously mentioned, the R''' group is a lower alkyl radical, for example, an alkyl radical containing from 1 to about 7 carbon atoms, such as methyl, ethyl, propyl, butyl, isobutyl, amyl, and the like. In the preferred embodiment of the invention, both the R' and R'' radicals are alkyl or aryl radicals with the methyl and phenyl radicals being the most preferred.

The polysiloxane-polyether block copolymer of Formula 2 can be prepared by the simple esterification of a liquid carboxy-alkyl containing organopolysiloxane with a liquid polyalkylene glycol monoether. The esterification is carried out in the presence of a suitable inert solvent and catalyst under sufficient heat to achieve the reflux temperature of the solvent. A suitable inert solvent and catalyst in which to carry out such esterification may be, for example, toluene and p-toluene sulfonic acid. Preparation of the polysiloxane-polyester block copolymer is described in U.S. Pat. No. 3,182,076 and U.S. Pat. No. 3,629,165 both of which are incorporated herein by reference.

In the practice of the present invention, the polysiloxane-polyether block copolymer may be used without solvent or combined with an organic solvent to form a dissolved surfactant or surfactant mix which is added to the uncured coating mix in such an amount that the polysiloxane-polyether surfactant is present in a quantity of from about 0.05% to about 3% by weight of the polyfunctional acrylate. Preferably, the surfactant mix should contain from about 30% to about 70% by weight an organic solvent preferably, toluene.

Additionally, the uncured coating mix contains azobisisobutyronitrile in an amount necessary to effect the cure and decorative appearance of the coating. Specifically, azobisisobutyronitrile should be added to the amount of from about 0.25% to about 5% by weight based upon the weight of the polyfunctional acrylate. Other photoinitiators have been found unsatisfactory, producing smooth transparent coatings rather than a translucent and decorative coating having regularly spaced parallel ridges.

The coating compositions of the instant invention may optionally contain at least one latent UV light absorbing compound. The compounds which are suitable are well known to those skilled in the art. The preferred latent UV light absorbing compound is resorcinol monobenzoate. The compound may be present in an amount, based upon the weight of the coating composition, of from about 1 to about 20 weight percent, and preferably from about 3 to about 15 weight percent.

The addition of a latent UV light absorbing compound makes the coated article less susceptible to photo-degradation.

The coating compositions of the instant invention may also optionally contain various flatting agents, thixotropic agents, and dyes. All of these additives and the use thereof are well known in the art and do not require extensive discussion. It is understood that any compounds possessing the ability to function in such a manner, that is, as a flatting agent and the like, can be used so long as they do not deleteriously affect the photocuring of the coating compositions and do not adversely affect the translucent and decorative character of the coating.

The decorative coating of the present invention can be applied to any polymeric substrate, however, it is preferable that the article or substrate be comprised of polycarbonate. The preferred polycarbonates are unbranched or branched homopolymers and copolymers and mixtures thereof that are prepared by reacting a dihydric phenol with a carbonate precursor. Typical of some of the dihydric phenols that may be employed to make substrates in the practice of this invention are (2,2-bis(4-hydroxyphenyl)propane), bis(4-hydroxyphenyl)methane, 2,2-bis(4-hydroxy-3-methylphenyl)-propane, 3,3-bis(4-hydroxyphenyl)pentane, 2,2-bis(3,5-dicholoro-4-hydroxyphenyl)-propane, 2,2-bis(3,4,5-dibromo-4-hydroxyphenyl)propane, bis(3-chloro-4-hydroxyphenyl)methane. Other dihydric phenols of the bisphenol type are also available and are disclosed in U.S. Pat. Nos. 2,999,835 and 3,334,154.

It is possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in the preparation of the aromatic carbonate polymers useful for the substrates of this invention. Also employed in the practice of this invention may be blends of any of the above materials to provide the aromatic carbonate polymer.

The carbonate precursor used to make typical polycarbonate substrates may be either a carbonyl halide, a carbonate ester or a haloformate. Specific carbonate precursors are well known to those skilled in the art. Carbonyl chloride, also known as phosgene, is preferred.

The carbonate polymers of this invention may be prepared by employing a molecular weight regulator, an acid aceptor and a catalyst. Selection of the proper substance to perform these functions is well known in the art.

Also included herein are the polymeric derivatives of a dihydric phenol, a dicarboxylic acid, and carbonic acid. These are disclosed in U.S. Pat. No. 3,169,121 which is incorporated herein by reference.

The polycarbonates as a class of compounds are well known and recognized by those experienced in the art. The polycarbonates heretofore mentioned are for the sake of example only and are not to be construed as limiting the scope of this invention. More detailed examples of polycarbonates are found in U.S. Pat. Nos. 3,153,008, 3,028,365, and 3,021,305 which are incorporated herein by reference.

In the practice of the present invention, the photocurable coating compositions are first compounded by adding together the polyfunctional acrylic monomers or mixtures thereof, the surfactant or surfactant mix, azobisisobutyronitrile, and, optionally, any of the other previously mentioned additives. Additionally, if it is desirable to reduce the viscosity of the coating formulation, an organic solvent, such as an alcohol, may be incorporated into the formulation. Generally, the amount of solvent present, if any, should be such that evaporation of the solvent occurs before any deleterious effect develops on the substrate due to the aggressiveness (in the chemical etching sense) of the coating composition.

The various components are thoroughly mixed so as to form a generally homogeneous coating composition. Though the thickness of the coating is not critical, a uniform coating of from about 0.05 mil to about 1 mil of the composition is then applied onto the substrate surface by any of the known means such as dipping, spraying, roll-coating and the like. The coating is cured in an inert, e.g., nitrogen atmosphere, by UV irradiation which can have a wavelength of from 1849 A. to 4000 A. The lamp systems used to generate such radiation may be an ultraviolet lamp which can consist of discharge lamps, as for example, xenon, metallic halide, metallic arc, such as low or high pressure mercury vapor discharge lamp, etc., having operating pressures of from as low as a few milli-torr up to about 10 atmospheres. By curing is meant both polymerization of the polyfunctional acrylic monomers and cross-linking of the polymers to form hard, non-tacky coatings.

PREFERRED EMBODIMENT OF THE INVENTION

In order to more fully and clearly illustrate the present invention, the following specific examples are presented. It is intended that the examples be considered as illustrative rather than limiting the invention disclosed and claimed herein.

EXAMPLE 1

A coating material was prepared by blending 1.2 g of azobisisobutyronitrile with 30 g of 1,6-hexane dioldiacrylate and 30 g of trimethylolpropane triacrylate. A film about 1 mil in thickness of this coating material was wire roll bar coated onto a 10 mil thick substrate of polycarbonate and passed through a Linde medium pressure lamp UV cure oven at about 50 ft./minute under a blanket of nitrogen. The resultant coating was transparent and smooth. The coating of this example did not give the desired translucent and decorative coating.

EXAMPLE 2

The remaining coating material of Example 1 was modified by the addition of 1 g of a 50/50 weight ratio mixture of the disclosed polysiloxane-polyether block copolymer and toluene. The polysiloxane-polyether block copolymer and toluene mixture is a silicone oil type surface active agent produced by Mallinckrodt Chemical Co. under the designation Byk-300. A film about 1 mil in thickness of this coating composition was wire roll bar coated onto a 10 mil polycarbonate substrate and passed through a Linde UV cure over at about 50 ft./minute under a blanket of nitrogen. Surprisingly, it cured to a translucent and decorative coating which was wrinkled in a macroscopically irregular but microscopically regular manner to give a frost-like decorative appearance.

EXAMPLE 3

A coating material was prepared by blending 0.9 g of a 50/50 weight ratio mixture of the disclosed polysiloxane-polyether block copolymer and toluene, Byk-300, with 12.5 g of 1,6-hexane dioldiacrylate, 12.5 g of trimethylolpropane triacrylate, and 0.5 g of the initiator, dimethoxyphenylacetylphenone. A film about 1 mil in thickness was wire roll bar coated onto a 10 mil polycarbonate substrate and cured in the manner of Examples 1 and 2. The resultant coating was found to be transparent rather than translucent and decorative as with the azobisisobutyronitrile initiated coating of Example 2.

EXAMPLE 4

The coating of example 2 was wire roll bar coated onto a 10 mil polycarbonate substrate to form a 0.5 mil film and cured by the method of the foregoing examples. The resultant coating was translucent and decorative with some non-uniformity. This non-uniformity may be due to variations in the coating thickness.

EXAMPLE 5

The coating of Example 3 was wire roll bar coated onto a 10 mil polycarbonate substrate to form a 1.2 mil film and cured by the method of the above examples. The resultant coating was transparent and smooth without any pattern generation. The coating of this example had no decorative effect.

Although specific embodiments of the invention have been described, it should not be limited to the particular compositions and articles described herein, but is intended to include all modifications that may be made which, pursuant to the patent statutes and laws, do not depart from the spirit and scope of the invention.

What is claimed is:

1. An ultraviolet light curable decorative coating composition for plastic substrates which coating comprises:
   (i) from about 0.25% to about 5% by weight azobisisobutyronitrile;
   (ii) at least one ultraviolet light curable cross-linkable polyfunctional acrylate monomer represented by the general formula:

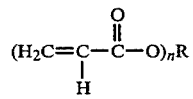

wherein n is an integer having a value of from 2 to 4 inclusive, and R is selected from the group consisting of n valent hydrocarbon residue, n valent substituted hydrocarbon residue, n valent aliphatic hydrocarbon residue containing at least one ether linkage, and n valent substituted aliphatic hydrocarbon residue containing at least one ether linkage; and
   (iii) from about 0.05% to about 3% by weight of a polysiloxane-polyether block copolymer, which is represented by the general formula:

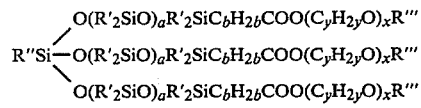

where R' and R" are monovalent hydrocarbon radicals; R''' is a lower alkyl radical; a has a value of about 2 to about 40; b has a value of 2 or 3; y has a value of 2 to 4 inclusive; and x has a value of about 5 to about 150, and optionally, a solvent.

2. The coating of claim 1, wherein said n valent hydrocarbon residue and said n valent substituted hydrocarbon residue are an unbranched or branched saturated aliphatic hydrocarbon and contain from 1 to about 20 carbon atoms; and said n valent aliphatic hydrocarbon residue containing at least one ether linkage and said n valent substituted aliphatic hydrocarbon residue containing at least one ether linkage are an unbranched or branched saturated aliphatic hydrocarbon, contain from 2 to about 20 carbon atoms, and contain up to 5 ether linkages.

3. The coating of claim 1 wherein the composition consists of a mixture of at least one diacrylate monomer and at least one triacrylate monomer.

4. The coating of claim 3 wherein the mole ratio of the diacrylate to the triacrylate is from about 30/70 to about 70/30.

5. The coating of claim 4 wherein said diacrylate monomer is selected from the group consisting of 1,6-hexane dioldiacrylate and diethylene glycol diacrylate and said triacrylate monomer is selected from the group consisting of trimethylol propane triacrylate and pentaerythritol triacrylate.

6. The composition of claim 1 which additionally contains from about 1 to about 20% by weight a latent UV light absorber.

7. The coating composition of claim 1 wherein said plastic substrate is polycarbonate.

8. A method for applying a decorative outer coating to a plastic substrate which method comprises:
  (i) mixing from about 0.25 to about 5% by weight azobisisobutyronitrile, at least one ultraviolet light curable cross-linkable polyfunctional acrylate monomer represented by the general formula:

$$(H_2C=CH-CO-O)_nR$$

wherein n is an integer having a value of from 2 to 4 inclusive, and R is selected from the group consisting of n valent hydrocarbon residue, n valent substituted hydrocarbon residue, n valent aliphatic hydrocarbon residue containing at least one ether linkage, and n valent substituted aliphatic hydrocarbon residue containing at least one ether linkage, and from about 0.05 to about 3% by weight of at least one polysiloxane-polyether block copolymer surfactant represented by the general formula:

$$R''Si{\begin{matrix}O(R'_2SiO)_aR'_2SiC_bH_{2b}COO(C_yH_{2y}O)_xR'''\\-O(R'_2SiO)_aR'_2SiC_bH_{2b}COO(C_yH_{2y}O)_xR'''\\O(R'_2SiO)_aR'_2SiC_bH_{2b}COO(C_yH_{2y}O)_xR'''\end{matrix}}$$

wherein R' and R'' are monovalent hydrocarbon radicals, R''' is a lower alkyl radical, a has a value from 2 to about 40, b has a value of 2 or 3, y has a value of from 2 to 4 inclusive, and x has a value of about 5 to about 150, which polysiloxane-polyether block copolymer may be dissolved in an optional organic solvent to form a surfactant mix;
  (ii) coating said plastic substrate with the mixture to a thickness of from about 0.5 to about 1 mil; and
  (iii) photocuring the coating, thereby producing a translucent, frost-like, decorative coating.

9. The method according to claim 8 wherein said plastic substrate is a polycarbonate substrate.

10. The method according to claim 8 wherein an organic solvent constitutes up to about 70% by weight of said surfactant mix.

11. The method according to claim 8, wherein said n valent hydrocarbon residue and n valent substituted hydrocarbon residue are unbranched or branched saturated aliphatic compounds containing from 1 to about 20 carbon atoms and the n valent aliphatic hydrocarbon residue containing at least one ether linkage and n valent substituted aliphatic hydrocarbon residue containing at least one ether linkage are unbranched or branched saturated aliphatic compounds, containing from 2 to about 20 carbon atoms and up to 5 ether linkages.

12. The method according to claim 8 wherein the coating composition consists of a mixture of at least one diacrylate monomer and at least one triacrylate monomer.

13. The method of claim 12 wherein the ratio, by weight, of the diacrylate to the triacrylate is from about 30/70 to about 70/30.

14. The coating of claim 13 wherein said diacrylate monomer is selected from the group consisting of 1,6-hexane dioldiacrylate and diethylene glycol diacrylate and said triacrylate monomer is selected from the group consisting of trimethylol propane triacrylate and pentaerythritol triacrylate.

15. An article comprising a plastic substrate coated with about 0.5 mil to about 1 mil of an ultraviolet light cured coating composition which coating comprises the photo-reaction products of:
  (i) from about 0.25% to about 5% by weight azobisisobutyronitrile;
  (ii) from about 0.05% to about 3% by weight a polysiloxane-polyether block copolymer surfactant, which is represented by the general formula:

$$R''Si{\begin{matrix}O(R'_2SiO)_aR'_2SiC_bH_{2b}COO(C_yH_{2y}O)_xR'''\\-O(R'_2SiO)_aR'_2SiC_bH_{2b}COO(C_yH_{2y}O)_xR'''\\O(R'_2SiO)_aR'_2SiC_bH_{2b}COO(C_yH_{2y}O)_xR'''\end{matrix}}$$

wherein R' and R'' are monovalent hydrocarbon radicals, R''' is lower alkyl radical; a has a value from 2 to about 40; b has a value of 2 or 3; y has a value of from 2 to 4 inclusive; and x has a value of about 5 to about 150; and optionally, an organic solvent for a polysiloxane-polyether block copolymer surfactant mix; and
  (iii) at least one ultraviolet light curable, cross-linkable, polyfunctional acrylate monomer represented by the general formula:

$$(H_2C=CH-CO-O-)_nR$$

wherein n is 2, 3 or 4, and R is selected from the group consisting of a substituted or unsubstituted n valent hydrocarbon residue and a substituted or unsubstituted n valent hydrocarbon residue containing at least one ether linkage.

16. The article of claim 15, wherein said n valent hydrocarbon residue and said n valent substituted hydrocarbon residue are an unbranched or branched saturated aliphatic hydrocarbon and contain from 1 to about 20 carbon atoms; and said n valent aliphatic hydrocarbon residue containing at least one ether linkage and said n valent substituted aliphatic hydrocarbon residue containing at least one ether linkage are an unbranched or branched saturated hydrocarbon, contain from 2 to about 20 carbon atoms, and contain up to 5 ether linkages.

17. The article of claim 15 wherein said plastic substrate is a polycarbonate substrate.

18. The article of claim 15 wherein said surfactant mix comprises up to about 70% by weight of an organic solvent.

19. The article of claim 15 wherein the coating composition consists of a mixture of at least one diacrylate monomer and at least one triacrylate monomer.

20. The article of claim 19 wherein the ratio, by weight, of the diacrylate to the triacrylate is from about 30/70 to about 70/30.

21. The coating of claim 20 wherein said diacrylate monomer is selected from the group consisting of 1,6-hexane dioldiacrylate and diethylene glycol diacrylate and said triacrylate monomer is selected from the group consisting of trimethylol propane triacrylate and pentaerythritol triacrylate.

22. The article of claim 15 wherein said coating further comprises from about 1% to about 20% by weight a latent UV light absorber.

* * * * *